US008286003B2

(12) United States Patent
Miyamoto et al.

(10) Patent No.: US 8,286,003 B2
(45) Date of Patent: Oct. 9, 2012

(54) ADDRESS LIST MANAGEMENT APPARATUS, ADDRESS LIST MANAGEMENT METHOD, AND STORAGE MEDIUM

(75) Inventors: Hirohisa Miyamoto, Kobe (JP); Minako Kobayashi, Ikeda (JP); Katsuhiko Akita, Amagasaki (JP); Okihisa Yoshida, Amagasaki (JP); Takehisa Yamaguchi, Ikoma (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1094 days.

(21) Appl. No.: 12/189,229

(22) Filed: Aug. 11, 2008

(65) Prior Publication Data
US 2009/0055644 A1    Feb. 26, 2009

(30) Foreign Application Priority Data

Aug. 22, 2007    (JP) .................. 2007-216081

(51) Int. Cl.
*G06F 12/14*    (2006.01)
*H04L 29/06*    (2006.01)
*H04N 1/00*    (2006.01)
(52) U.S. Cl. ......... 713/193; 713/162; 358/404; 358/402
(58) Field of Classification Search .................. 713/162, 713/189, 193; 709/232, 238, 239; 358/404, 358/402, 1.15, 1.16
See application file for complete search history.

(56) References Cited

U.S. PATENT DOCUMENTS

| | | | | |
|---|---|---|---|---|
| 5,930,772 A | * | 7/1999 | Gomyo et al. ............... | 705/30 |
| 5,995,240 A | * | 11/1999 | Sato ............................. | 358/407 |
| 6,013,107 A | * | 1/2000 | Blackshear et al. .......... | 709/229 |
| 7,383,304 B2 | * | 6/2008 | Shimada et al. ............. | 709/206 |
| 7,483,942 B2 | * | 1/2009 | Nakayama et al. ........... | 709/203 |
| 7,743,404 B1 | * | 6/2010 | Deutschmann et al. ......... | 726/2 |

FOREIGN PATENT DOCUMENTS

| | | |
|---|---|---|
| JP | 10-041972 | 2/1998 |
| JP | 2000-165591 | 6/2000 |
| JP | 2002-281211 | 9/2002 |
| JP | 2003-008857 | 1/2003 |
| JP | 2004-260417 A | 9/2004 |
| JP | 2005-236516 | 9/2005 |
| JP | 2006-065726 A | 3/2006 |
| JP | 2006-186919 | 7/2006 |

OTHER PUBLICATIONS

Notification of Reasons for Refusal in JP 2007-216081 dated Jul. 7, 2009, and an English Translation thereof.

* cited by examiner

*Primary Examiner* — Zachary A Davis
(74) *Attorney, Agent, or Firm* — Buchanan Ingersoll & Rooney PC

(57) ABSTRACT

An address list management apparatus stores, for each user of an MFP (Multi Function Peripheral), a different address list that lists address information pieces for transmission of image data by the MFP. Upon being instructed by a logged-in user to transmit image data, the MFP transmits, to the address list management apparatus, a request for the address list that specifies the user. Upon receiving the request, the address list management apparatus transmits, to the MFP, a sending list pertaining to the user. The sending list is created by deleting secret information from address information pieces in the address list, and modifying such address information pieces so that image data is transmitted to the address list management apparatus. The address list management apparatus refers to the address list, and transfers the image data to the specified address.

11 Claims, 21 Drawing Sheets

FIG. 11

| REGISTRATION NAME | TRANSMISSION METHOD | TRANSMISSION DESTINATION ADDRESS | TRANSMISSION DESTINATION DIRECTORY | LOGIN ID | PASSWORD | ... |
|---|---|---|---|---|---|---|
| DESTINATION 1 | E-mail | abc@klm.jp | | | | ... |
| DESTINATION 2 | FTP | 10.224.16.19 | test | User1 | abcd | ... |
| DESTINATION 3 | SMB | TARO | test1 | User2 | hcdka | ... |
| DESTINATION 4 | WebDAV | http://10.234.16.30:10080/ | test2 | User3 | klmnopq | ... |
| DESTINATION 5 | I-FAX | kkkk@heanfahgfah.com | | | | ... |
| DESTINATION 6 | IP ADDRESS FAX | 10.234.17.20 | | | | ... |
| DESTINATION 7 | G3FAX | 334567890 | | | | ... |
| DESTINATION 8 | E-mail | cde@lihfa.com | | | | ... |
| DESTINATION 9 | FTP | 10.224.16.25 | test3 | | | ... |
| DESTINATION 10 | SMB | HANAKO | test4 | User4 | kakiku | ... |
| DESTINATION 11 | WebDAV | http://10.234.16.30:10080/ | test5 | | | ... |
| DESTINATION 12 | E-mail | nahfdga@naiuf.co.jp | | | | ... |
| DESTINATION 13 | FTP | 10.224.16.39 | test6 | User5 | | ... |
| DESTINATION 14 | SMB | 10.234.16.22 | test7 | User6 | kennaki | ... |
| DESTINATION 15 | WebDAV | http://10.234.16.30:10080/ | test8 | User7 | | ... |
| DESTINATION 16 | E-mail | nfahgfa@nvauihfa.jp | | | | ... |
| DESTINATION 17 | FTP | 10.224.16.44 | test9 | User8 | | ... |
| DESTINATION 18 | SMB | ICHIRO | test10 | User9 | kukuku | ... |
| DESTINATION 19 | WebDAV | http://10.234.16.30:10080/ | test11 | | | ... |

FIG. 12

| REGISTRATION NAME | TRANSMISSION METHOD | TRANSMISSION DESTINATION ADDRESS | TRANSFER METHOD | TRANSFER DESTINATION ADDRESS | TRANSFER FOLDER | ... |
|---|---|---|---|---|---|---|
| DESTINATION 1 | E-mail | abc@klm.jp | | | | ... |
| DESTINATION 2 | FTP | 10.224.16.19 | SMB | 10.234.17.77 | UserA¥test | ... |
| DESTINATION 3 | SMB | TARO | SMB | 10.234.17.77 | UserA¥test1 | ... |
| DESTINATION 4 | WebDAV | htpp://10.234.16.30:10080/ | SMB | 10.234.17.77 | UserA¥test2 | ... |
| DESTINATION 5 | I-FAX | kkkk@heanfahgfah.com | | | | ... |
| DESTINATION 6 | IP ADDRESS FAX | 10.234.17.20 | | | | ... |
| DESTINATION 7 | G3FAX | 334567890 | | | | ... |
| DESTINATION 8 | E-mail | cde@lihfa.com | SMB | 10.234.17.77 | UserA¥test4 | ... |
| DESTINATION 9 | FTP | 10.224.16.25 | | | | ... |
| DESTINATION 10 | SMB | HANAKO | SMB | 10.234.17.77 | UserA¥test6 | ... |
| DESTINATION 11 | WebDAV | htpp://10.234.16.30:10080/ | SMB | 10.234.17.77 | UserA¥test7 | ... |
| DESTINATION 12 | E-mail | nahfdga@naiuf.co.jp | | | | ... |
| DESTINATION 13 | FTP | 10.224.16.39 | SMB | 10.234.17.77 | UserA¥test8 | ... |
| DESTINATION 14 | SMB | 10.234.16.22 | | | | ... |
| DESTINATION 15 | WebDAV | htpp://10.234.16.30:10080/ | | | | ... |
| DESTINATION 16 | E-mail | nfahgfa@nvauihfa.jp | | | | ... |
| DESTINATION 17 | FTP | 10.224.16.44 | SMB | 10.234.17.77 | UserA¥test9 | ... |
| DESTINATION 18 | SMB | ICHIRO | SMB | 10.234.17.77 | UserA¥test10 | ... |
| DESTINATION 19 | WebDAV | htpp://10.234.16.30:10080/ | | | | ... |

FIG. 13

| TRANSFER FOLDER | TRANSMISSION METHOD | TRANSMISSION DESTINATION ADDRESS | TRANSMISSION DESTINATION DIRECTORY | LOGIN ID | PASSWORD |
|---|---|---|---|---|---|
| UserA¥test | FTP | 10.224.16.19 | test | User1 | abcd |
| UserA¥test1 | SMB | TARO | test1 | User2 | hcdka |
| UserA¥test2 | WebDAV | htpp://10.234.16.30:10080/ | test2 | User3 | klmnonopq |
| UserA¥test4 | SMB | HANAKO | test4 | User4 | kakiku |
| UserA¥test6 | FTP | 10.224.16.39 | test6 | User5 | |
| UserA¥test7 | SMB | 10.234.16.22 | test7 | User6 | kennaki |
| UserA¥test8 | WebDAV | htpp://10.234.16.30:10080/ | test8 | User7 | |
| UserA¥test9 | FTP | 10.224.16.44 | test9 | User8 | |
| UserA¥test10 | SMB | ICHIRO | test10 | User9 | kukuku |

FIG. 21

| REGISTRATION NAME | TRANSMISSION METHOD | TRANSMISSION DESTINATION ADDRESS | TRANSMISSION DESTINATION DIRECTORY | LOGIN ID | PASSWORD | ... |
|---|---|---|---|---|---|---|
| DESTINATION 1 | E-mail | abc@klm.jp | | | | ... |
| DESTINATION 2 | FTP | 10.234.17.77 | UserA¥test | | | ... |
| DESTINATION 3 | SMB | 10.234.17.77 | UserA¥test1 | | | ... |
| DESTINATION 4 | WebDAV | 10.234.17.77 | UserA¥test2 | | | ... |
| DESTINATION 5 | I-FAX | kkkk@heanfahgfah.com | | | | ... |
| DESTINATION 6 | IP ADDRESS FAX | 10.234.17.20 | | | | ... |
| DESTINATION 7 | G3FAX | 334567890 | | | | ... |
| DESTINATION 8 | E-mail | cde@lihfa.com | | | | ... |
| DESTINATION 9 | FTP | 10.224.16.25 | | | | ... |
| DESTINATION 10 | SMB | 10.234.17.77 | UserA¥test4 | | | ... |
| DESTINATION 11 | WebDAV | http://10.234.16.30:10080/ | | | | ... |
| DESTINATION 12 | E-mail | nahfdga@naiuf.co.jp | | | | ... |
| DESTINATION 13 | FTP | 10.234.17.77 | UserA¥test6 | | | ... |
| DESTINATION 14 | SMB | 10.234.17.77 | UserA¥test7 | | | ... |
| DESTINATION 15 | WebDAV | 10.234.17.77 | UserA¥test8 | | | ... |
| DESTINATION 16 | E-mail | nfahgfa@nvauihfa.jp | | | | ... |
| DESTINATION 17 | FTP | 10.234.17.77 | UserA¥test9 | | | ... |
| DESTINATION 18 | SMB | 10.234.17.77 | UserA¥test10 | | | ... |
| DESTINATION 19 | WebDAV | http://10.234.16.30:10080/ | | | | ... |

# ADDRESS LIST MANAGEMENT APPARATUS, ADDRESS LIST MANAGEMENT METHOD, AND STORAGE MEDIUM

This application claims priority to application No. 2007-216081 filed in Japan, the content of which is hereby incorporated by reference.

BACKGROUND OF THE INVENTION

1. Field of the Invention

The present invention relates to an address list management apparatus, an address list management method, and a storage medium, and in particular to technology for preventing the leakage of secret information during image communication.

2. Description of the Related Art

In recent years, image formation apparatuses such as MFPs (Multi Function Peripherals) have widely been connected to a communication network and have been able to exchange image data, etc. Depending on the use environment of the image formation apparatus, such as an office, there are often cases in which two or more users share an image formation apparatus.

When address information for image data is registered in an image formation apparatus shared by two or more users, the address information must be managed separately for each user since it is necessary to maintain the confidentiality of the addresses, which are private to each individual.

Also, technology for managing address books user-by-user in an address book server has been proposed since there are often cases in which two or more image formation apparatuses are connected to a communication network in an office environment. This enables the same address book to be referenced from any of the image formation apparatuses on the communication network, which improves user-convenience when transmitting image data.

However, when for example transmitting image data from an image formation apparatus to an FTP (File Transfer Protocol) server, the image formation apparatus must acquire the address information of the FTP server from the address book server. This address information of course also includes the login information for the FTP server.

For this reason, each time the image formation apparatus transmits image data to the FTP server, the login information for the FTP server is transmitted from the address book server to the image formation apparatus. If someone were snooping the network during this time, the login information could be leaked, which would lead to the leakage of secret information stored on the FTP server.

The leakage of login information can be prevented by causing all of the image formation apparatuses to transfer image data to the address book server, but this increases the load borne by the address book server, and risks hindering smooth communication.

This problem arises not only with FTP, but also in all communication methods that require some sort of secret information when transferring image data.

SUMMARY OF THE INVENTION

The present invention has been achieved in view of the above problem, and an aim thereof is to provide an address list management apparatus, address list management method, and storage medium that prevent the leakage of secret information required for the transmission of image data, while reducing the processing load.

In order to achieve the above aim, an address list management apparatus of the present invention is an address list management apparatus for recording an address list that is specific to a single user of an image formation apparatus and includes one or more address information pieces for transmission of data by the image formation apparatus, the address list management apparatus including: a sending list creator operable to create a sending list by, for each address information piece including secret information in the address list, deleting the secret information and changing each address information piece such that data to be transmitted from the image formation apparatus to a specified address in the sending list is instead to be transmitted to the address list management apparatus; an address list request receiver operable to receive an address list request which is a request from the image formation apparatus for the address list specific to the user; a sending list transmitter operable to, upon reception of the address list request, transmit the sending list that pertains to the user to the image formation apparatus; and a data transfer part operable to, upon reception of the data along with specification of an address from the image formation apparatus, refer to the address list and transfer the received data to the specified address.

According to this structure, the processing load is prevented from becoming concentrated on the address list management apparatus, and secret information is not exchanged between the address list management apparatus and the image formation apparatus, thereby preventing the leakage of the secret information.

Also, the address list management apparatus may further include a data storage having one or more storage areas for storing data, each storage area storing data for a different pair of the user of the image formation apparatus and an address, and operable to store the data received from the image formation apparatus in the storage area corresponding to the pair of the user and the address that pertain to the received data.

Here, the data storage may be further operable to delete the data from the corresponding storage area after the data transfer part has transferred the data. Also, each of the one or more storage areas may be associated with a different one of the one or more address information pieces, and in order to transfer the data, the data transfer part may first refer to the address information piece associated with the storage area storing the data.

Furthermore, the secret information is preferably a login ID and a password for logging in to an address.

Similarly, an address list management method of the present invention is used by an apparatus for recording an address list that is specific to a single user of an image formation apparatus and includes one or more address information pieces for transmission of data by the image formation apparatus, the address list management method including the steps of: creating a sending list by, for each address information piece including secret information in the address list, deleting the secret information and changing the address information piece such that data is transmitted to the apparatus for recording the address list; receiving an address list request which is a request from the image formation apparatus for the address list specific to the user; transmitting, upon reception of the address list request, the sending list that pertains to the user to the image formation apparatus; and referring, upon reception of the data along with specification of an address from the image formation apparatus, to the address list and transmitting the received data to the specified address.

Also, a storage medium of the present invention stores therein a program executed by an apparatus for recording an address list that is specific to a single user of an image formation apparatus and includes one or more address information pieces for transmission of data by the image formation apparatus, the program including the steps of: creating a sending list by, for each address information piece including secret information in the address list, deleting the secret information and changing the address information piece such that data is transmitted to the apparatus for recording the address list; receiving an address list request which is a request from the image formation apparatus for the address list specific to the user; transmitting, upon reception of the address list request, the sending list that pertains to the user to the image formation apparatus; and referring, upon reception of the data along with specification of an address from the image formation apparatus, to the address list and transmitting the received data to the specified address.

BRIEF DESCRIPTION OF THE DRAWINGS

These and other objects, advantages, and features of the invention will become apparent from the following description thereof taken in conjunction with the accompanying drawings, which illustrate a specific embodiment of the present invention.

In the drawings:

FIG. 11 is a table showing an exemplary data structure of a user-specific address list pertaining to the embodiment of the present invention;

FIG. 12 is a table showing an exemplary data structure of a sending list pertaining to the embodiment of the present invention;

FIG. 13 is a table showing an exemplary data structure of a link table pertaining to the embodiment of the present invention;

FIG. 21 is a table showing an exemplary sending list pertaining to a modification of the present invention.

DESCRIPTION OF THE PREFERRED EMBODIMENT

Embodiments of an address list management apparatus, address list management method, and storage medium of the present invention are described below, taking the example of an image communication system and with reference to the drawings.

1. Image Communication System 1-1. Structure of Image Communication System

First, the following describes the structure of an image communication system of the present embodiment.

Figure 1:
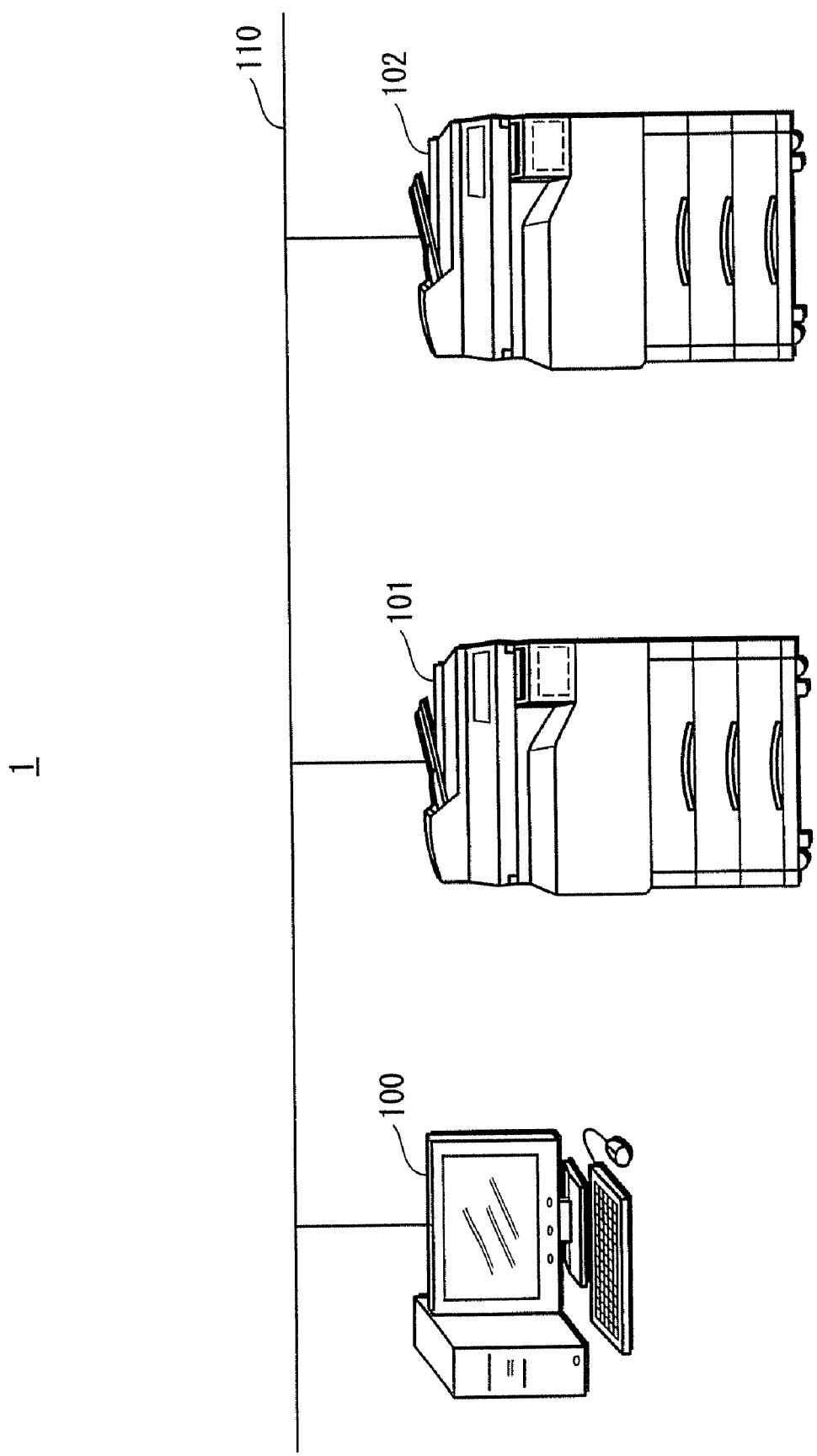
FIG. 1 shows a principal structure of an image communication system pertaining to the embodiment of the present invention.

FIG. 1 shows a principal structure of the image communication system of the present embodiment. As shown in FIG. 1, an image communication system 1 includes an address list management apparatus 100 and MFPs (Multi Function Peripherals) 101 and 102, which are all connected to a LAN (Local Area Network) 110. The address list management apparatus 100 and MFPs 101 and 102 perform IP (Internet Protocol) communication with each other via the LAN 110.

1-2. Communication Sequence

The following describes a typical communication sequence in the image communication system 1.

Figure 2:
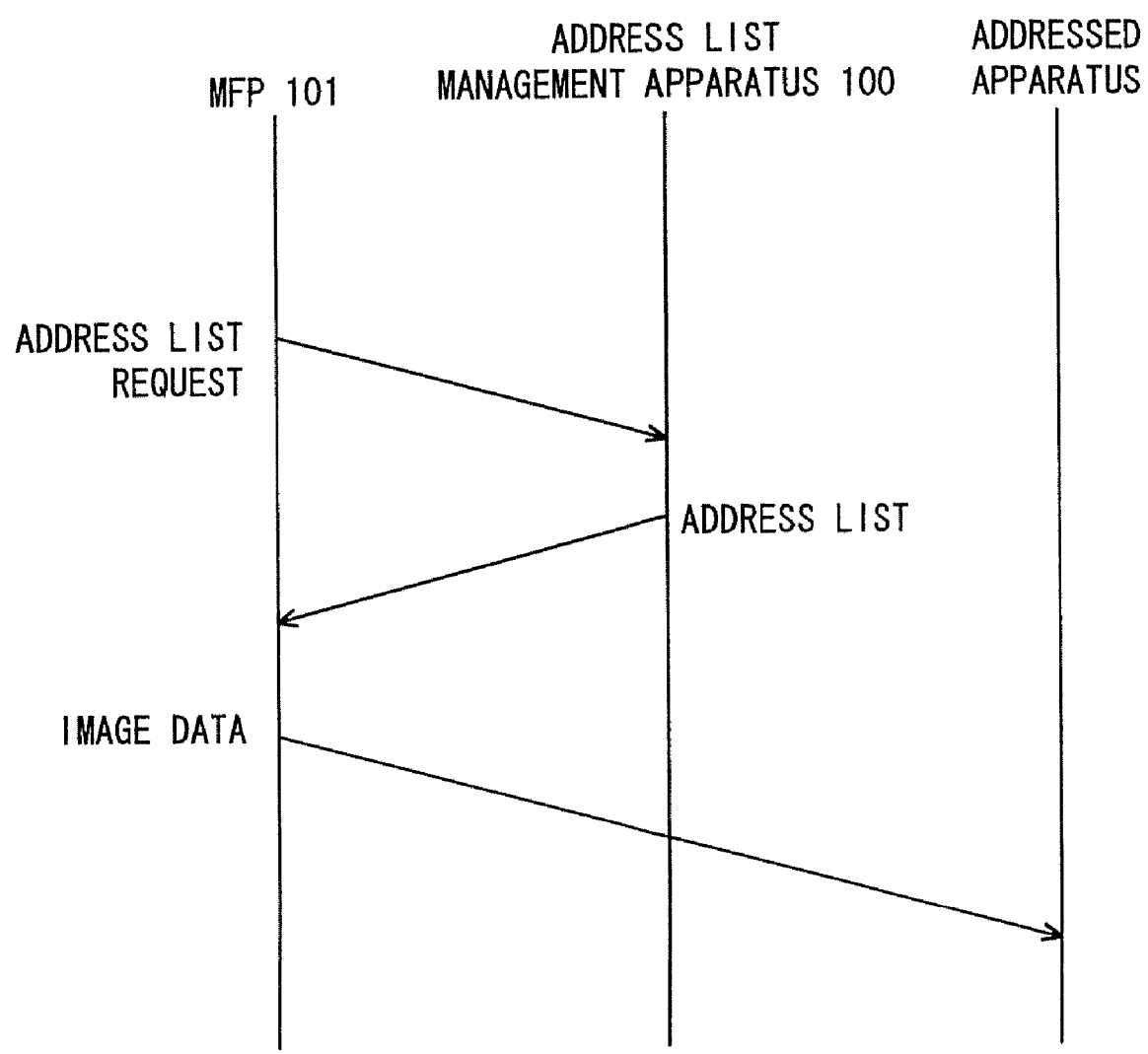
FIG. 2 shows a typical communication sequence in an image communication system 1 pertaining to the embodiment of the present invention, where login information is not necessary when transmitting image data to an addressed apparatus.

FIG. 2 shows a typical communication sequence in the image communication system 1, where login information is not necessary when transmitting image data to an addressed apparatus.

As shown in FIG. 2, before transmitting image data to the addressed apparatus, the MFP 101 requests an address list from the address list management apparatus 100. The address list includes an address information piece for each addressed apparatus that is an image data transmission destination.

In response to the request, the address list management apparatus 100 transmits the requested address list to the MFP 101. The MFP 101 reads the address information for the addressed apparatus from the acquired address list, and transmits the image data to the addressed apparatus.

Figure 3:
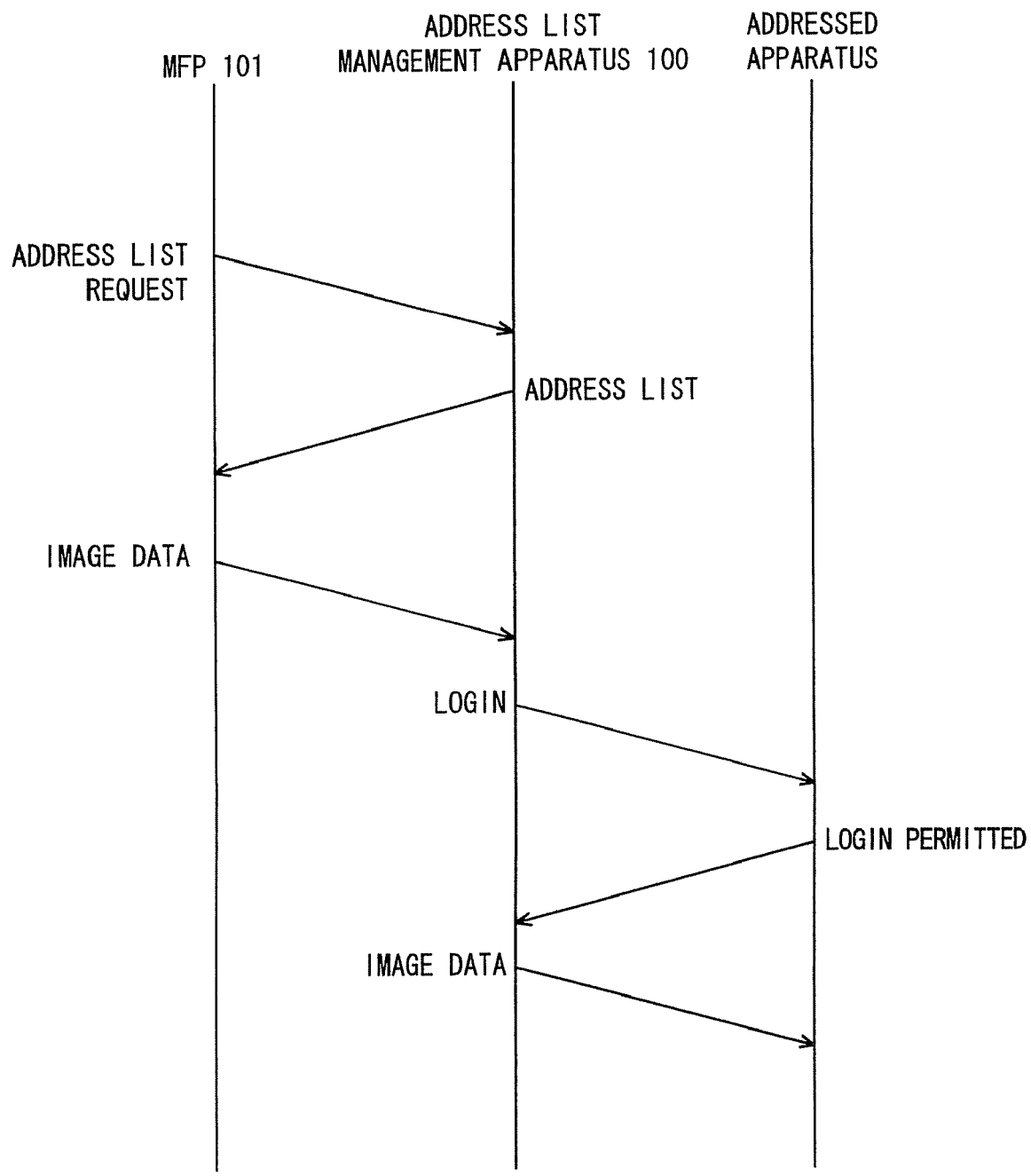
FIG. 3 shows another typical communication sequence in the image communication system 1 pertaining to the embodiment of the present invention, where login information is necessary when transmitting image data to the addressed apparatus.

FIG. 3 shows another typical communication sequence in the image communication system 1, where login information is necessary when transmitting image data to the addressed apparatus.

As shown in FIG. 3, the MFP 101 requests the address list, and the address list management apparatus 100 transmits the address list thereto. In this case, the address list management apparatus 100 transmits, to the MFP 101, an address list in which its own address is the address of the addressed apparatus.

The address list management apparatus 100 then receives the image data from the MFP 101, and thereafter transmits login information to the addressed apparatus. If login is permitted, the address list management apparatus 100 transmits the image data to the addressed apparatus in place of the MFP 101.

In this way, the address list management apparatus 100 does not transmit login information to the MFP 101, thereby preventing the leakage of the login information.

2. Address List Management Apparatus 100

2-1. Hardware Structure

The following describes the hardware structure of the address list management apparatus 100.

Figure 4:
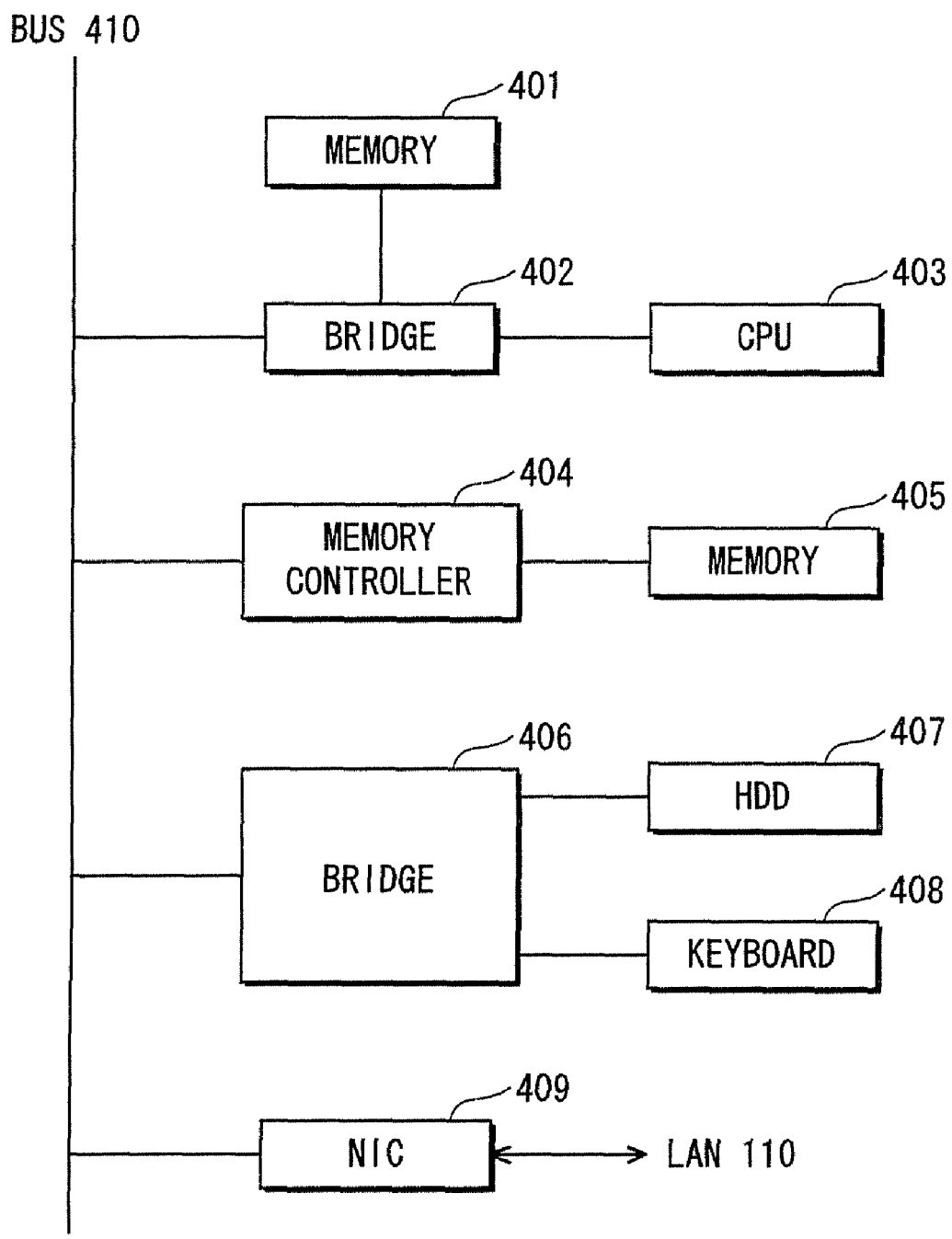
FIG. 4 shows a principal hardware structure of an address list management apparatus 100 pertaining to the embodiment of the present invention.

FIG. 4 shows the principal hardware structure of the address list management apparatus 100. As shown in FIG. 4, the address list management apparatus 100 includes a CPU (Central Processing Unit) 403, memories 401 and 405, bridges 402 and 406, a memory controller 404, an HDD (Hard Disk Drive) 407, a keyboard 408, an NIC (Network Interface Card) 409, and a bus 410.

The bridges 402 and 406, the memory controller 404, and the NIC 409 are interconnected by the bus 410. The CPU 403 and memory 401 are connected to the bus 410 via the bridge 402. The memory 405 is connected to the bus 410 via the memory controller 404, and the HDD 407 and keyboard 408 are connected to the bus 410 via the bridge 406.

The NIC 409 receives a request from the MFP 101 or 102 and transmits the address list via the LAN 110. The address list to be transmitted to the MFP 101 or 102 is stored in the HDD 407.

2-2. Functional Structure

The following describes the functional structure of the address list management apparatus 100.

Figure 5:
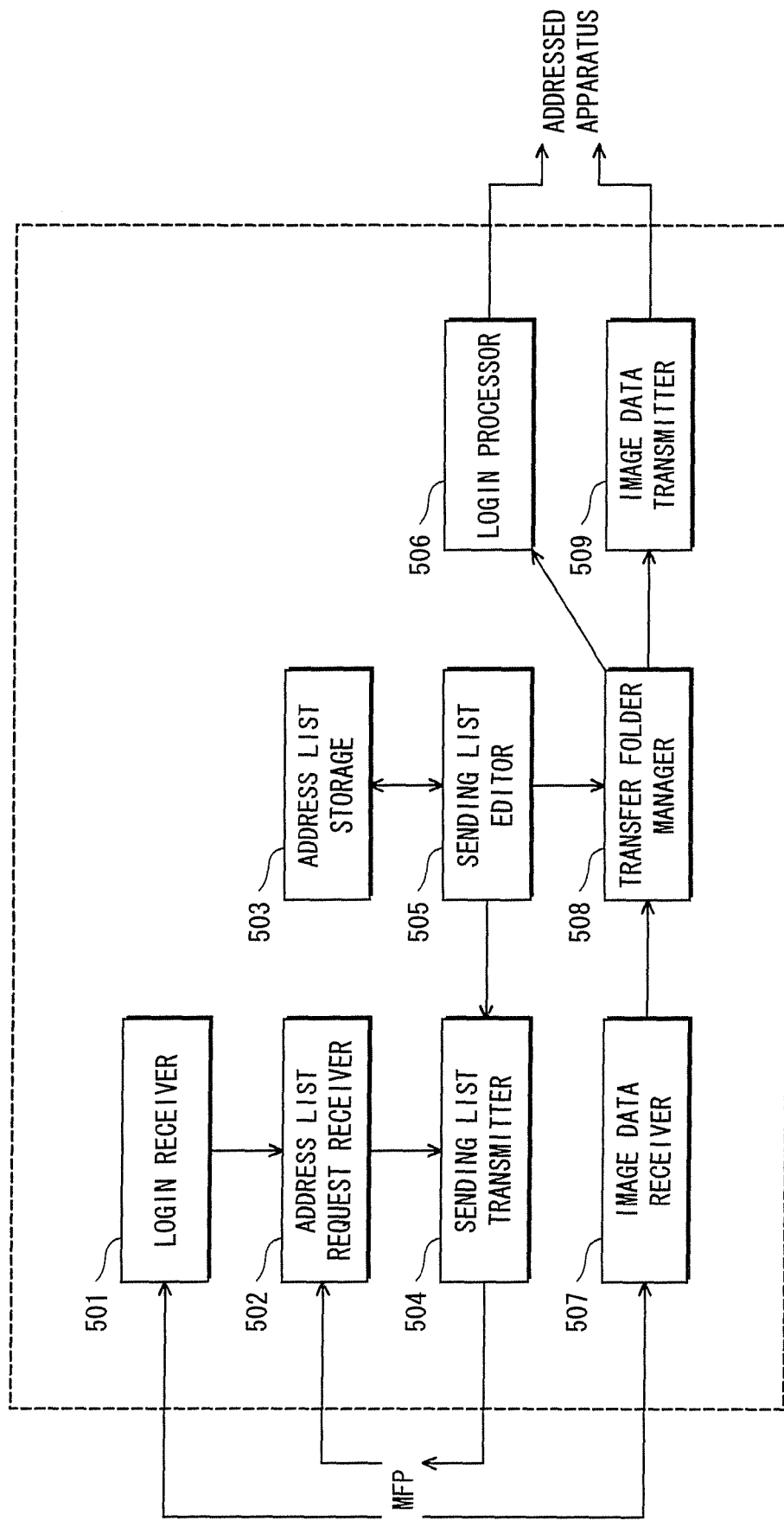
FIG. 5 is a block diagram showing a principal functional structure of the address list management apparatus 100 pertaining to the embodiment of the present invention.

FIG. 5 is a block diagram showing a principal functional structure of the address list management apparatus 100. As shown in FIG. 5, the address list management apparatus 100 includes a login receiver 501, an address list request receiver 502, an address list storage 503, an address list transmitter 504, an address list editor 505, a login processor 506, an image data receiver 507, a transfer folder manager 508, and an image data transmitter 509.

The login receiver 501 receives a login request that specifies an MFP user from the MFP 101 or 102 via the LAN 110.

The address list request receiver 502 receives an address list request from an MFP permitted to perform login.

The address list storage 503 stores a different address list for each MFP user in the HDD 407.

The address list transmitter 504 transmits, to an MFP, an address list corresponding to a user who pertains to an address list request.

The address list editor 505 edits an address list for transmission to an MFP, and causes the transfer folder manager 508 to create a transfer folder, as described later. A transfer folder is provided for each combination of an addressed apparatus requiring login and an MFP user, and is linked to an address information piece that includes the login information for the addressed apparatus.

The login processor 506 requests to log in to an addressed apparatus in accordance with an instruction from the transfer folder manager 508.

The image data receiver 507 receives, from an MFP, image data along with the specification of a transfer folder, and stores the received image data in the specified transfer folder.

When image data is stored in a transfer folder, the transfer folder manager 508 instructs the login processor 506 to request to log in to the addressed apparatus pertaining to the transfer folder into which the image data was stored. If the login is successful, the transfer folder manager 508 instructs the image data transmitter 509 to transmit the image data to the addressed apparatus.

The image data transmitter 509 transmits image data to an addressed apparatus in accordance with an instruction from the transfer folder manager 508.

2-3. Operations

The following describes operations of the address list management apparatus 100.

Figure 6:
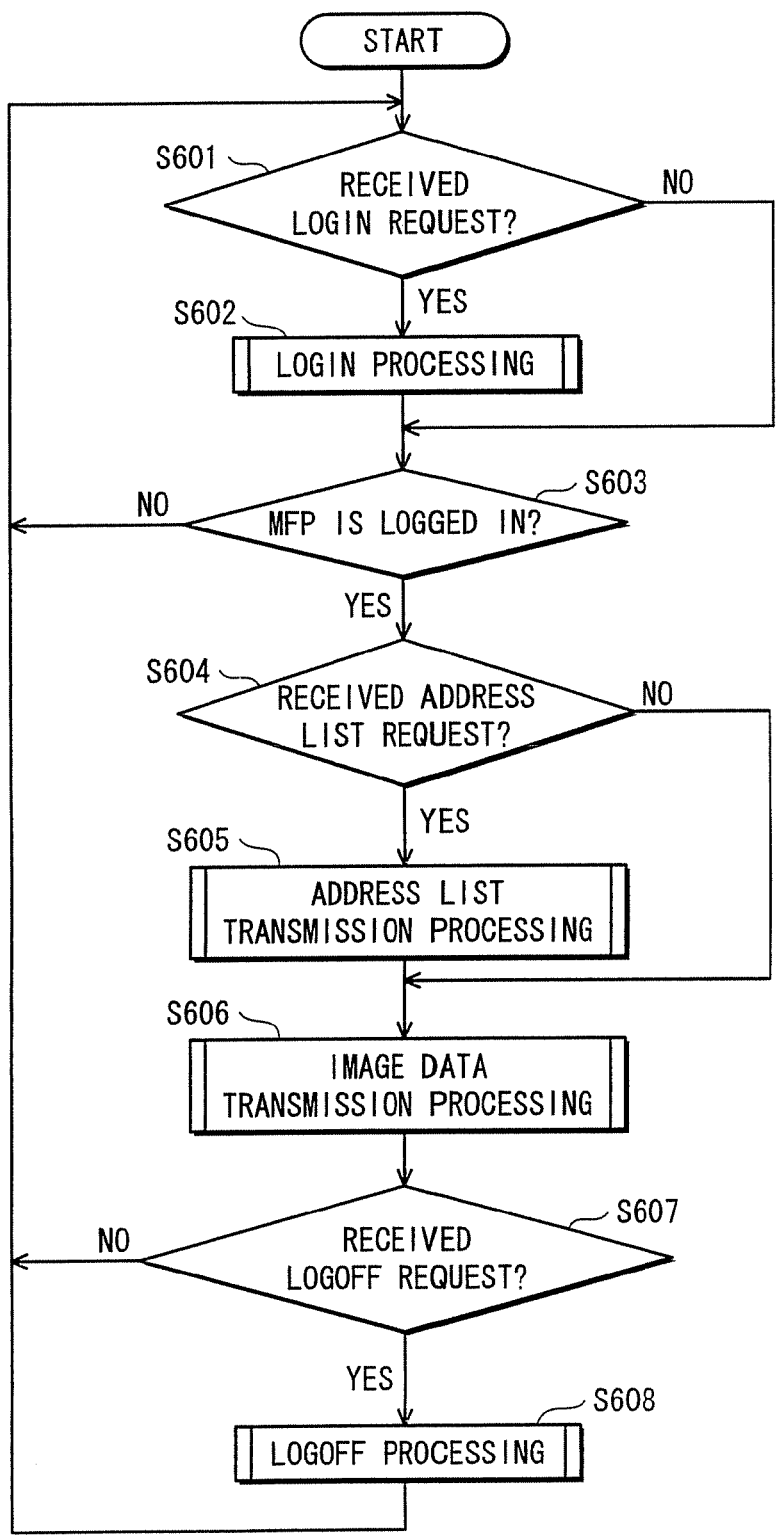
FIG. 6 is a flowchart showing principal operations of the address list management apparatus 100 pertaining to the embodiment of the present invention.

FIG. 6 is a flowchart showing principal operations of the address list management apparatus 100. As shown in FIG. 6, upon receiving a login request from an MFP (S601:YES), the address list management apparatus 100 performs login processing (S602).

Thereafter, if the MFP is logged in (S603:YES), and an address list request is received from the MFP (S604:YES) address list management apparatus 100 performs address list transmission processing (S605).

If an address list request has not been received (S604:NO), or the address list transmission processing (S605) has been performed, the address list management apparatus 100 performs image data transmission processing (S606). After the image data transmission processing (S606) has been performed, if a logoff request is received from the MFP (S607:YES), the address list management apparatus 100 performs logoff processing (S608).

If the MFP is not logged in (S603:NO), a logoff request has not been received (S607:NO), or the logoff processing (S608) has been performed, the address list management apparatus 100 returns to step S601 and repeats the above processing.

(a) Login Processing

The following describes the login processing (S602).

Figure 7:
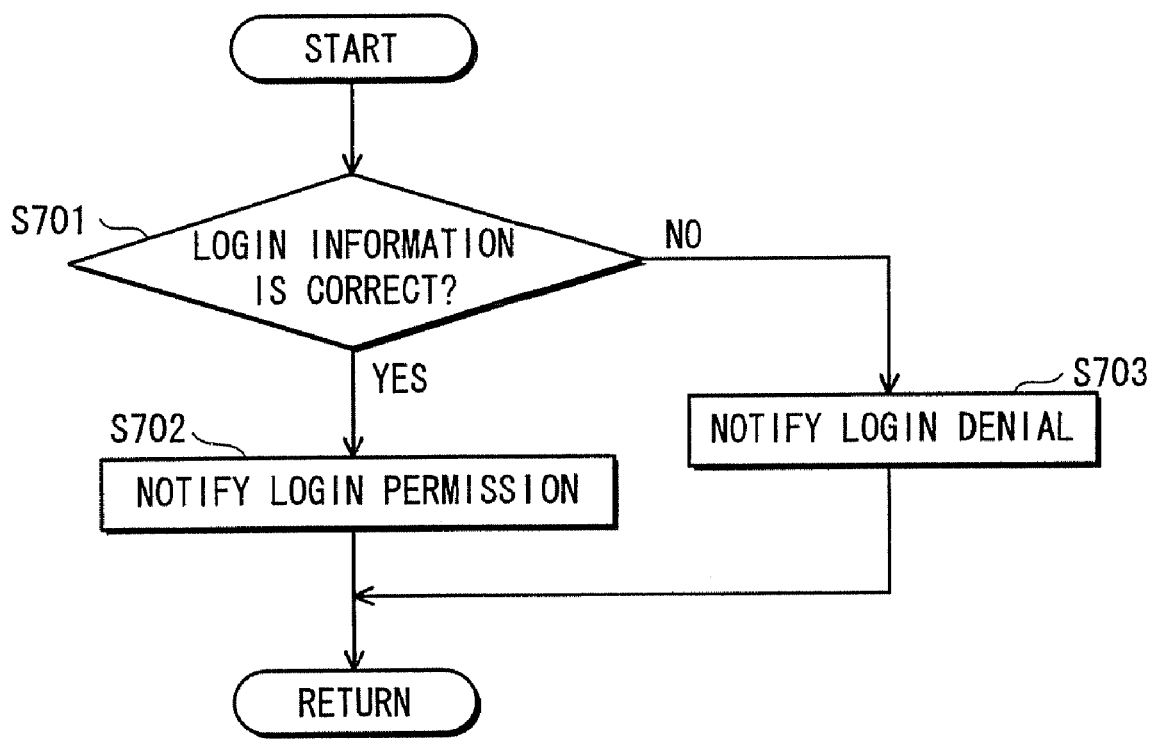
FIG. 7 is a flowchart showing login processing pertaining to the embodiment of the present invention.

FIG. 7 is a flowchart showing the login processing. A login ID and password of the MFP user are attached as login information to the login request received by the address list management apparatus 100 from the MFP.

As shown in FIG. 7, if the login information is correct (S701:YES), the address list management apparatus 100 notifies the MFP that login has been permitted (S702). However, if the login information is not correct (S701:NO), the address list management apparatus 100 notifies the MFP that login has been denied (S703). Upon receiving either notification, the MFP returns to a higher-level routine.

(b) Address List Transmission Processing

The following describes the address list transmission processing (S605).

Figure 8:
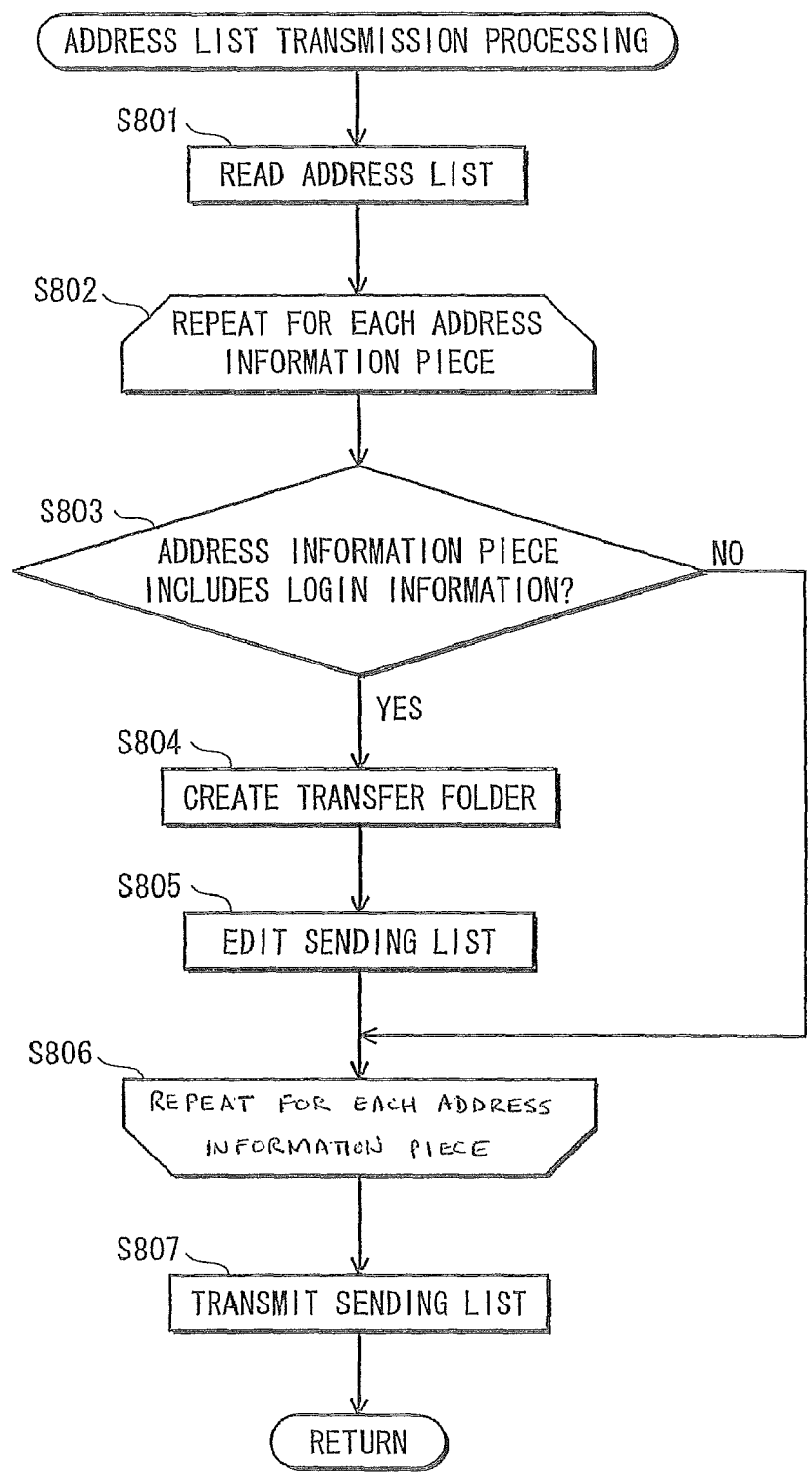
FIG. 8 is a flowchart showing address list transmission processing pertaining to the embodiment of the present invention.

FIG. 8 is a flowchart showing the address list transmission processing. As shown in FIG. 8, the address list management apparatus 100 first reads, from the HDD 407, the address list pertaining to the user of the MFP that transmitted the address list request (S801).

The address list includes address information for each address (transmission destination), and the address list management apparatus 100 repeats the processing from step S802 to step S806 for each piece of address information.

Specifically, for each address information piece, the address list management apparatus 100 checks whether login information (a login TD and password) is included, and if login information is included (S803:YES), creates a transfer folder and links the transfer folder to the address information piece (S804). The address list management apparatus 100 then deletes the login information from the address information piece, and edits the address list, which involves adding information necessary for storing image data in the transfer folder (S805).

When the above processing has been completed for all of the address information pieces, the address list management apparatus 100 transmits the edited address list to the MFP (S807), and returns to the main routine.

(c) Image Data Transmission Processing

The following describes the image data transmission processing (S606).

Figure 9:
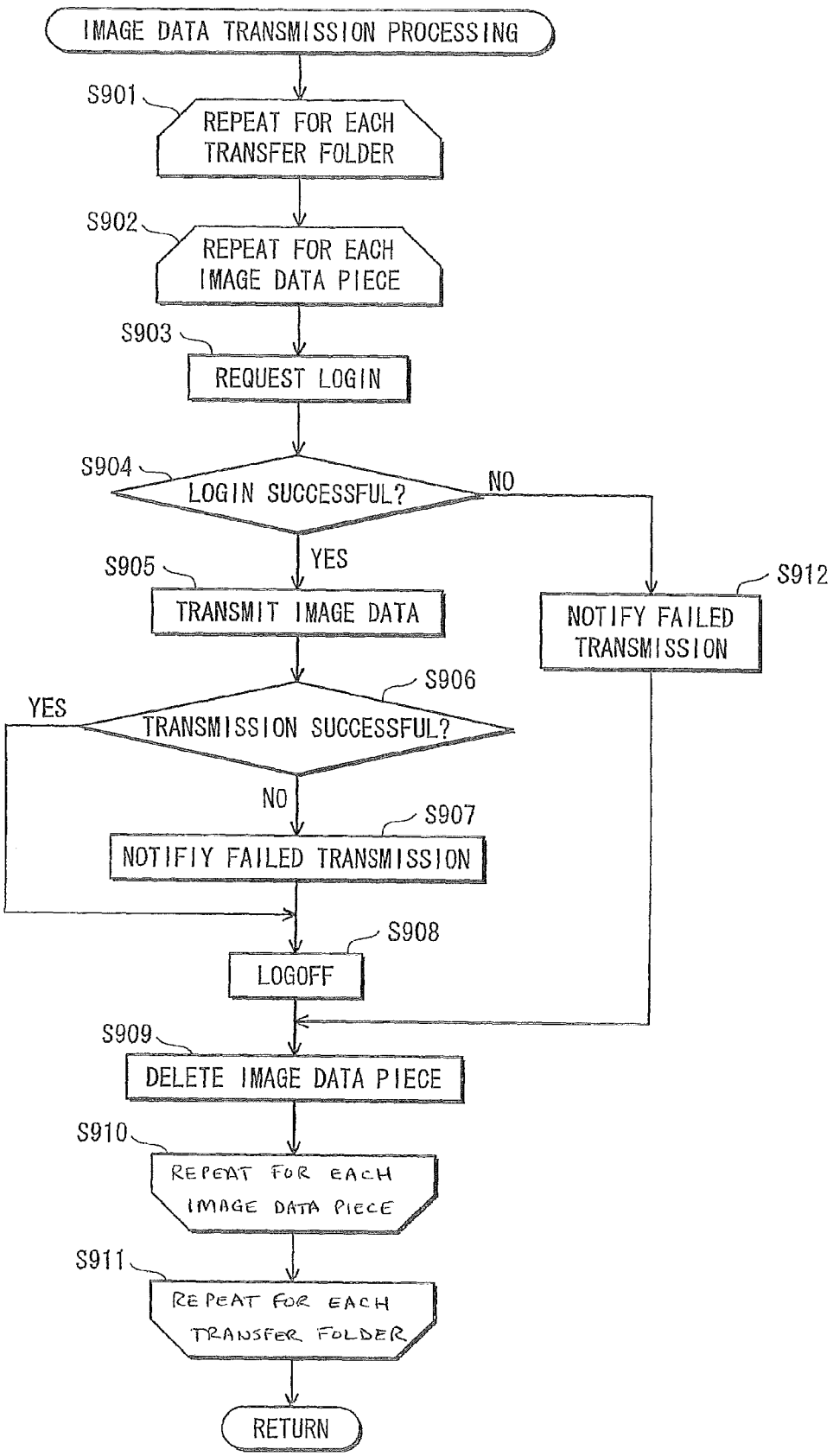
FIG. 9 is a flowchart showing image data transmission processing (S606) pertaining to the embodiment of the present invention.

FIG. 9 is a flowchart showing the image data transmission processing (S606). As shown in FIG. 9, the address list management apparatus 100 repeats the processing of step S901 to step S911 for each transfer folder. Also, the address list management apparatus 100 repeats the processing of step 902 to S910 for each image data piece stored in each transfer folder.

Specifically, for each image data piece, the address list management apparatus 100 references the address information pertaining thereto, and requests to log in to the addressed apparatus specified by the address information (S903). If the login is successful (S904:YES), the address list management apparatus 100 transmits the image data piece to the addressed apparatus (S905). If the transmission of the image data piece fails (S906:NO), the address list management apparatus 100 notifies the MFP to that effect (S907).

If the transmission of the image data piece is successful (S906:YES), or notification of transmission failure has been performed (S907), the address list management apparatus 100 logs off from the addressed apparatus (S908). Also, if the address list management apparatus 100 has notified the MFP that the transmission of the image data piece has failed due to a login failure (S912), or logged off from the addressed apparatus (S908), the address list management apparatus 100 deletes the image data piece from the transfer folder (S909).

(d) Logoff Processing

The following describes the logoff processing (S608).

Figure 10:
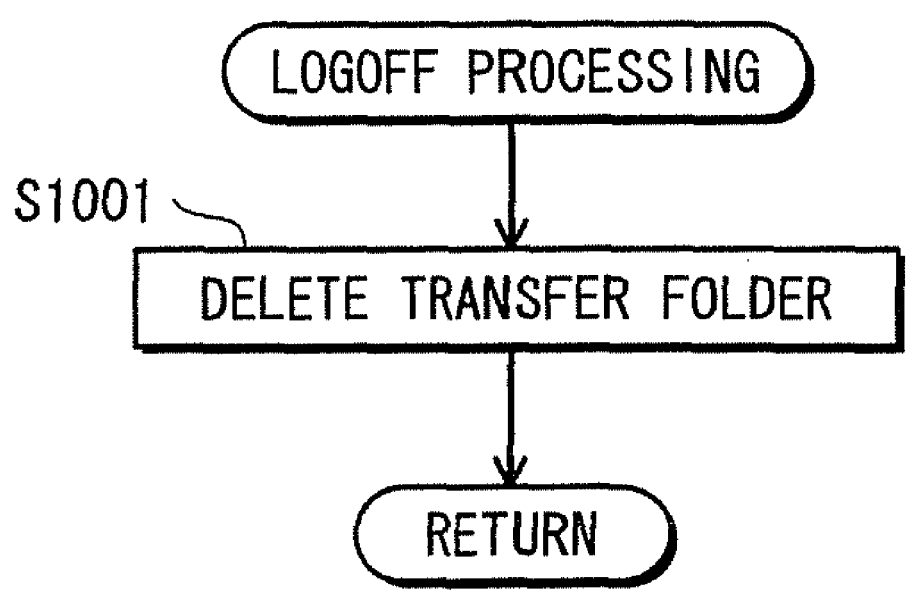
FIG. 10 is a flowchart showing logoff processing pertaining to the embodiment of the present invention.

FIG. 10 is a flowchart showing the logoff processing. As shown in FIG. 10, the address list management apparatus 100 deletes all transfer folders pertaining to the MFP that requested to logoff (S1001), and returns to a higher-level routine.

2-4. Management of Address Information

The following describes the management of address information, which is performed by the address list management apparatus 100.

The address list management apparatus 100 manages the three tables described below for managing address information. The three tables are namely a user-specific address list, a sending list, and a link table.

(a) Address List

The address list management apparatus 100 records, in the HDD 407, a different address list for each MFP user. The address list includes an address and transmission method for sending image data to an addressed apparatus, as well as secret information such as a login ID and password.

FIG. 11 shows an exemplary data structure of the user-specific address list. As shown in FIG. 11, for each address information piece, the user-specific address list records a registration name, a transmission method, a transmission destination address, a transmission destination directory, a login ID, and a password.

The registration names are character strings that are displayed in order for an MFP to allow a user to specify an address for image data.

The transmission method specifies a method of transmitting image data to an addressed apparatus.

The transmission destination address is the address of an addressed apparatus, which is used when transmitting image data to the addressed apparatus by the specified transmission method.

The transmission destination directory shows an addressed apparatus directory where image data is to be stored, if the transmission method is FTP, SMB (Server Message Block), or WebDAV (Distributed Authoring and Versioning protocol for the WWW).

The login ID and password are used for login processing (user authentication), if the transmission method is FTP, SMB, or WebDAV.

The address list management apparatus 100 does not transmit transmission destination directories, login IDs, or passwords to MFPs since the leakage of such information to a third party risks leading to an unforeseeable situation.

(b) Sending List

Address information such as the address of an addressed apparatus is necessary for an MFP to transmit image data to the addressed apparatus. However, there is the risk of leaking secret information such as a password if the address list management apparatus 100 transmits the address list to the MFP in its original form. The address list management apparatus 100 therefore creates a sending list based on the address list, and transmits the sending list to the MFP.

FIG. 12 is a table showing an exemplary data structure of the sending list. As shown in FIG. 12, for each address information piece, the sending list describes a registration name, a transmission method, a transmission destination address, a transfer method, a transfer destination address, and a transfer folder.

The registration names, transmission method, and transmission destination address are the same as in the address list.

The transfer method specifies a method by which an MFP is to transmit image data to the address list management apparatus 100, in order to cause the address list management apparatus 100 to transfer the image data to an addressed apparatus.

The transfer destination address is the address of the address list management apparatus 100, which is used in the transfer method.

The transfer folder specifies a folder in the address list management apparatus 100 where image data is to be stored.

Accordingly, the address list management apparatus 100 transmits image data to an addressed apparatus in place of an MFP, thereby preventing the leakage of secret information that may occur if the address list management apparatus 100 transmitted an address list to the MFP.

(c) Link Table

The link table records information in order for the address list management apparatus 100 to transmit, to an addressed apparatus, image data that has been stored in a transfer folder by an MFP. The link table is created when the address list management apparatus 100 creates a transfer folder.

FIG. 13 is a table showing an exemplary data structure of the link table. As shown in FIG. 13, for each address information piece, the link table records a transfer folder, a transmission method, a transmission destination address, a transmission destination directory, a login ID, and a password.

The transfer folder specifies a folder where image data to be transferred by the address list management apparatus 100 in place of an MFP is to be stored.

The transmission method specifies a method by which the address list management apparatus 100 is to transmit image data to an addressed apparatus.

The transmission destination address is the address of an addressed apparatus, which is used in the transmission method.

The transmission destination directory is an addressed apparatus directory where image data is to be stored by the address list management apparatus 100.

The login ID and password are used for the address list management apparatus 100 to log in to (i.e., perform user authentication with) an addressed apparatus.

3. MFPs 101 and 102

The following describes the MFP 101. A description of the principal structure of the MFP 102 has been omitted due to being the same as the below-described principal structure of the MFP 101.

3-1. Hardware Structure

The following describes the hardware structure of the MFP 101.

Figure 14:
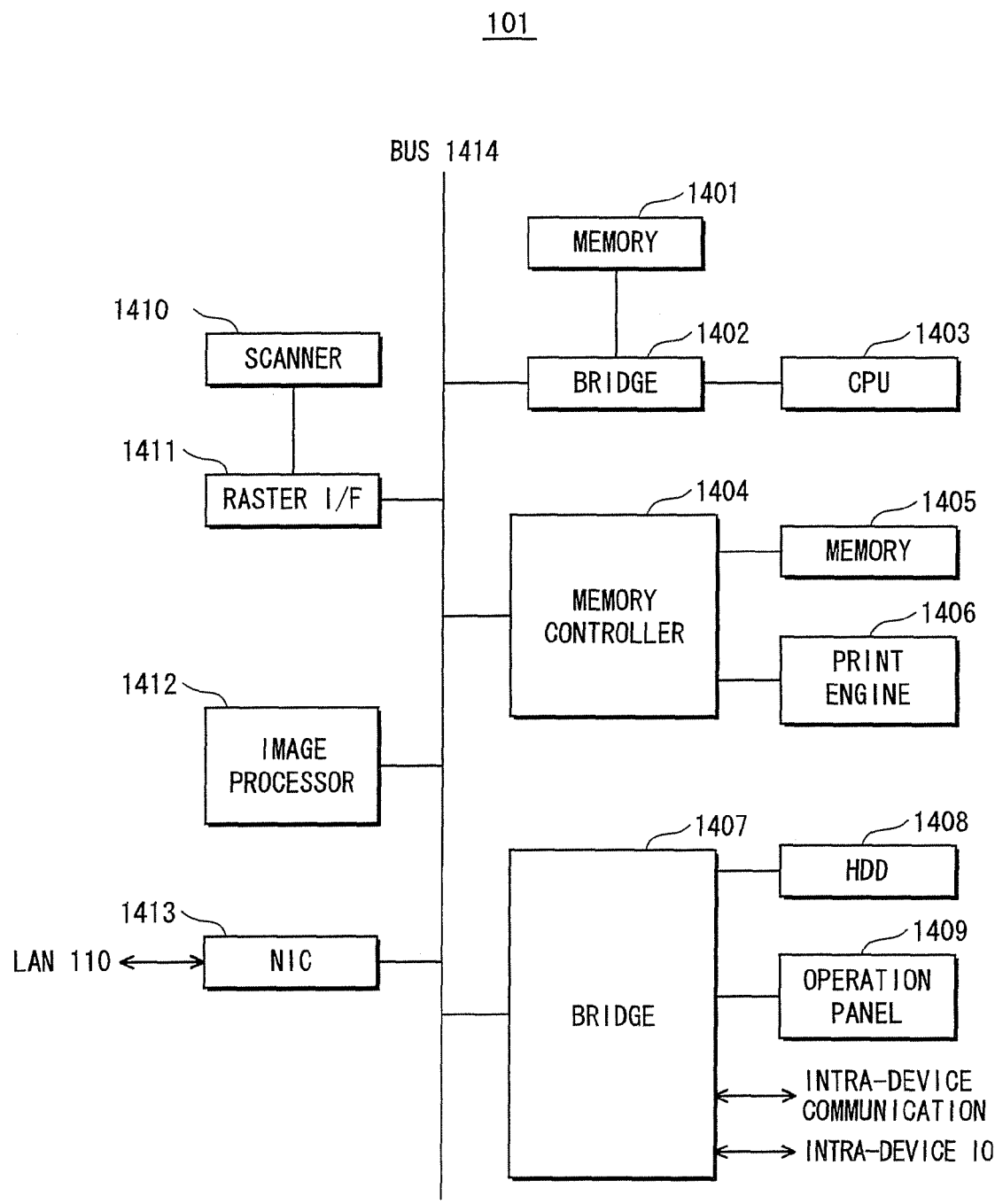
FIG. 14 is a block diagram showing a principal structure of an MFP (Multi Function Peripheral) 101 pertaining to the embodiment of the present invention.

FIG. 14 is a block diagram showing the principal structure of the MFP 101. As shown in FIG. 14, the MFP 101 includes a CPU 1403, memories 1401 and 1405, bridges 1402 and 1407, a memory controller 1404, a print engine 1406, an HDD 1408, an operation panel 1409, a scanner 1410, a raster interface 1411, an image processor 1412, an NIC 1413, and a bus 1414.

The bridges 1402 and 1407, the memory controller 1404, the raster interface 1411, the image processor 1412, and the NIC 1413 are interconnected via the bus 1414. The CPU 1403 and the memory 1401 are connected to the bus 1414 via the bridge 1402. The memory 1405 and the print engine 1406 are connected to the bus 1414 via the memory controller 1404, and the HDD 1408 and the operation panel 1409 are connected to the bus 1414 via the bridge 1407.

The NIC 1413 acquires address information from the address list management apparatus 100 and transmits image data via the LAN 110.

The image processor 1412 reads image data from memory 1405, performs image processing, and writes the resulting image-processed image data to the memory 1405. The image-processed image data is transferred to the print engine 1406 via the memory controller 1404, and is used in image formation.

Image data generated by the scanner 1410 passes through the raster interface 1411 etc. and is written to the memory 1405. After being image processed by the image processor 1412, the resulting image processed image data is used by the print engine 1406 in image formation.

The HDD 1408 stores so-called Box data. The operation panel 1409 receives input from a user, and displays information to the user.

3-2. Functional Structure

The following describes the functional structure of the MFP 101.

Figure 15:
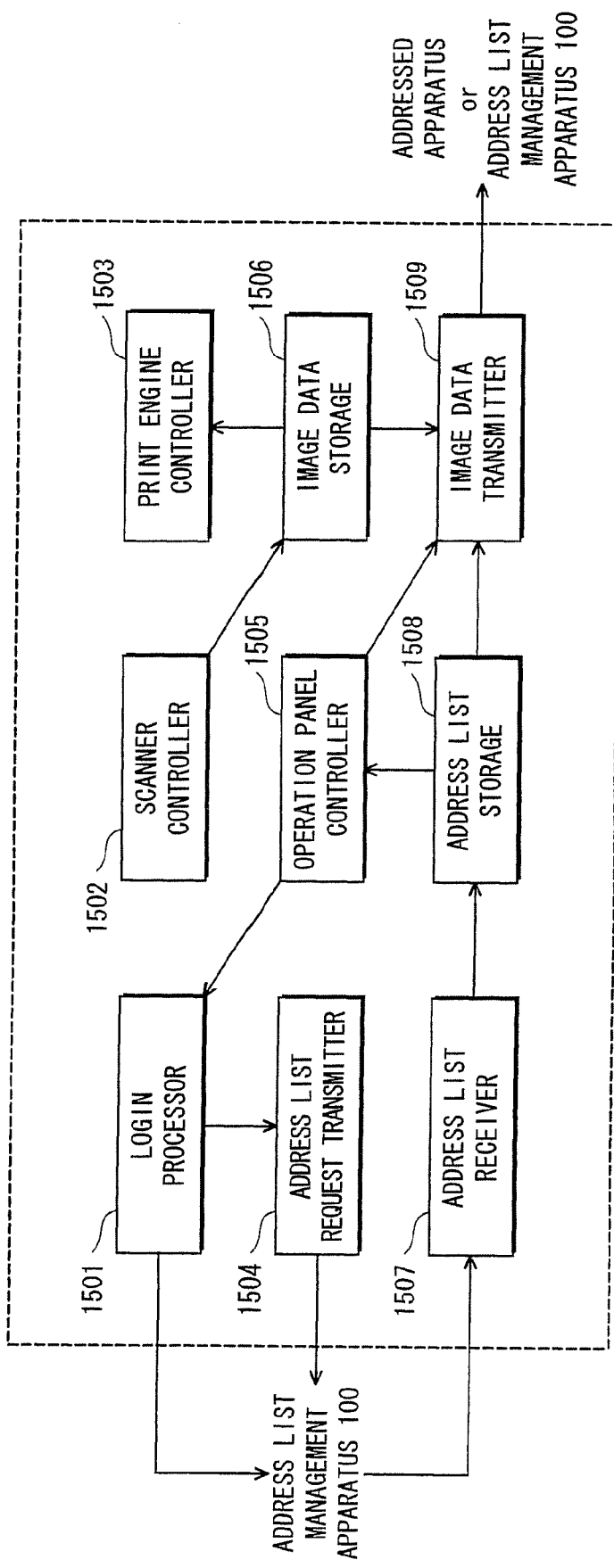
FIG. 15 is a block diagram showing a principal functional structure of the MFP 101 pertaining to the embodiment of the present invention.

FIG. 15 is a block diagram showing a principal functional structure of the MFP 101. As shown in FIG. 15, the MFP 101 includes a login processor 1501, a scanner controller 1502, a print engine controller 1503, an address list request transmitter 1504, an operation panel controller 1505, an image data storage 1506, an address list receiver 1507, an address list storage 1508, and an image data transmitter 1509.

Upon a user logging in to the MFP 101, the login processor 1501 logs into the address list management apparatus 100 with the login information of the MFP 101 user.

The print engine controller 1503 reads image data that is stored in the image data storage 1506, and performs image formation with use thereof.

The address list request transmitter 1504 transmits, to the address list management apparatus 100, an address list request that requests transmission of an address list.

The scanner controller 1502 controls a scanner to read an original, generates image data, and stores the image data in the image data storage 1506.

The image data storage 1506 stores image data generated by the scanner controller 1502.

The address list receiver 1507 receives an address list from the address list management apparatus 100, and stores the received address list in the address list storage 1508.

The address list storage 1508 stores an address list that the address list receiver 1507 has received from the address list management apparatus 100.

The image data transmitter 1509 transmits image data stored in the image data storage 1506 to either the address list management apparatus 100, or an addressed apparatus that a user has specified by the operation panel 1409.

3-3. Operations

The following describes operations of the MFP 101.

Figure 16:
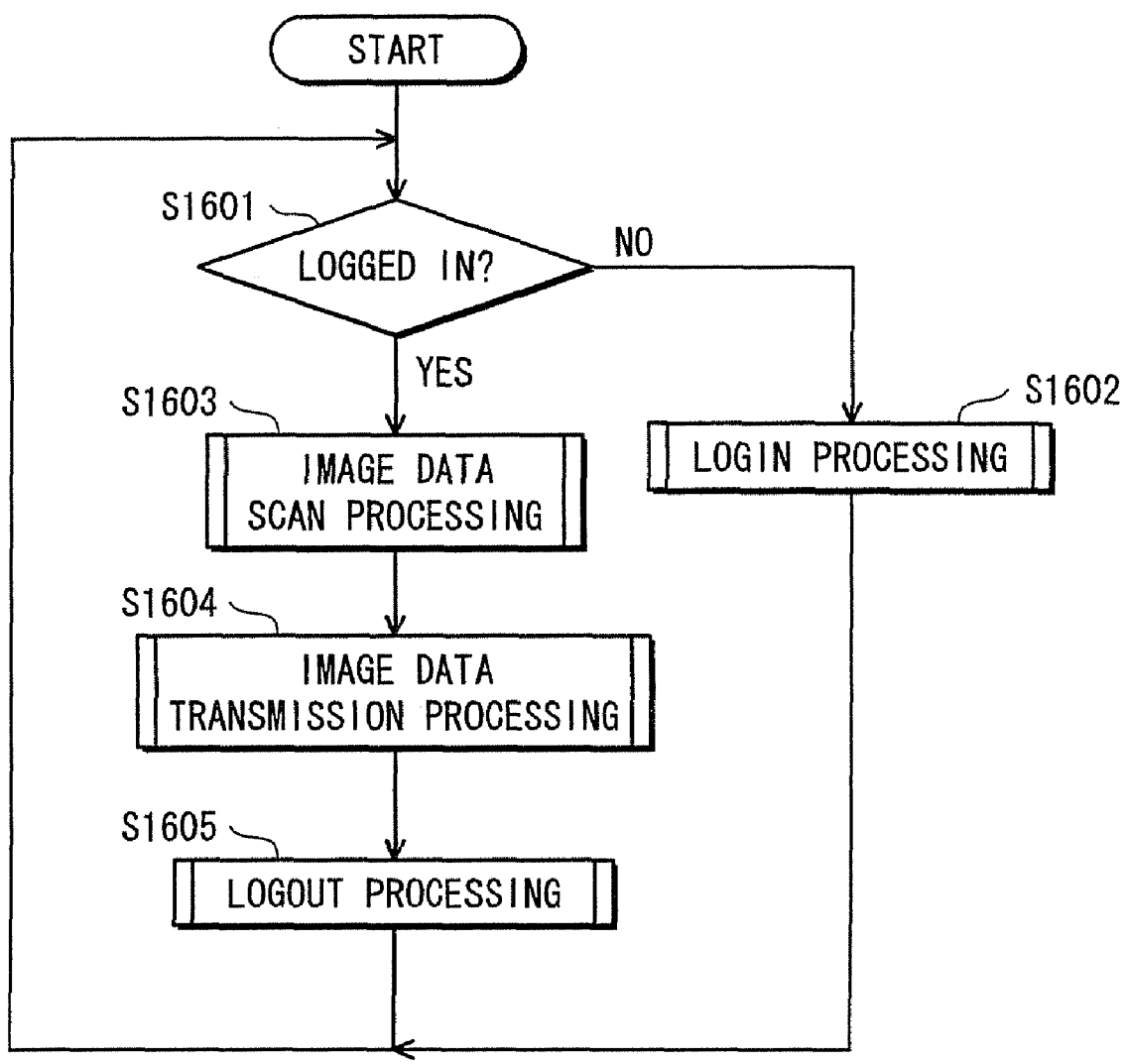
FIG. 16 is a flowchart showing principal operations performed by the MFP 101 pertaining to the embodiment of the present invention.

FIG. 16 is a flowchart showing principal operations of the MFP 101. As shown in FIG. 16, the MFP 101 first checks whether login has been performed, and if not logged in (S1601:NO), performs login processing (S1602). If logged in (S1601:YES), the MFP 101 performs image data scan processing (S1603), and then performs image data transmission processing (S1604). The MFP 101 returns to step S1601 after performing logout processing (S1605) or login processing (S1602).

(a) Login Processing

The following describes the login processing (S1602).

The MFP 101 performs user authentication by the login processing, and only permits use to a registered user.

Figure 17:
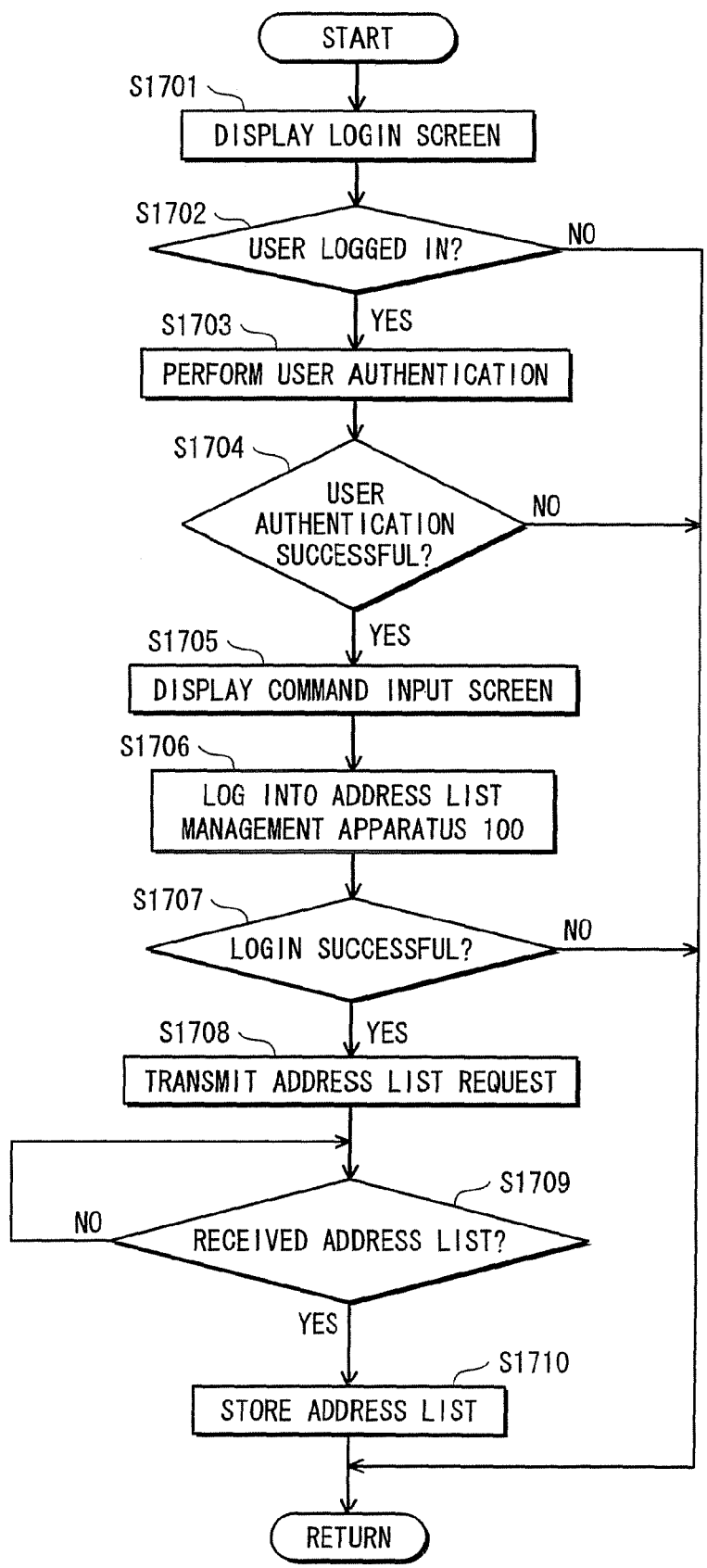
FIG. 17 is a flowchart showing login processing pertaining to the embodiment of the present invention.

FIG. 17 is a flowchart showing the login processing. As shown in FIG. 17, the MFP 101 first displays, on the operation panel 1409, a login screen that requests a login ID and password (S1701). If the MFP 101 judges that a user has logged in upon receiving an input of a login ID and password (S1702: YES), the MFP 101 performs user authentication using such input (S1703).

If user authentication is successful (S1704:YES), the MFP 101 displays a command input screen on the operation panel 1409 (S1705), and requests to log in to the address list management apparatus 100 (S1706). If the address list management apparatus 100 permits login (S1707:YES), the MFP 101 transmits an address list request to the address list management apparatus 100 (S1708). When the address list is received from the address list management apparatus 100 (S1709: YES), the MFP 101 stores the address list (S1710).

The MFP 101 returns to a higher-level routine if the user has not logged in (S1702:NO), if user authentication fails (S1704:NO), if login to the address list management apparatus 100 fails (S1707:NO), or after performing the processing of step S1710.

(b) Image Data Scan Processing

The following describes the image data scan processing (S1603).

Figure 18:
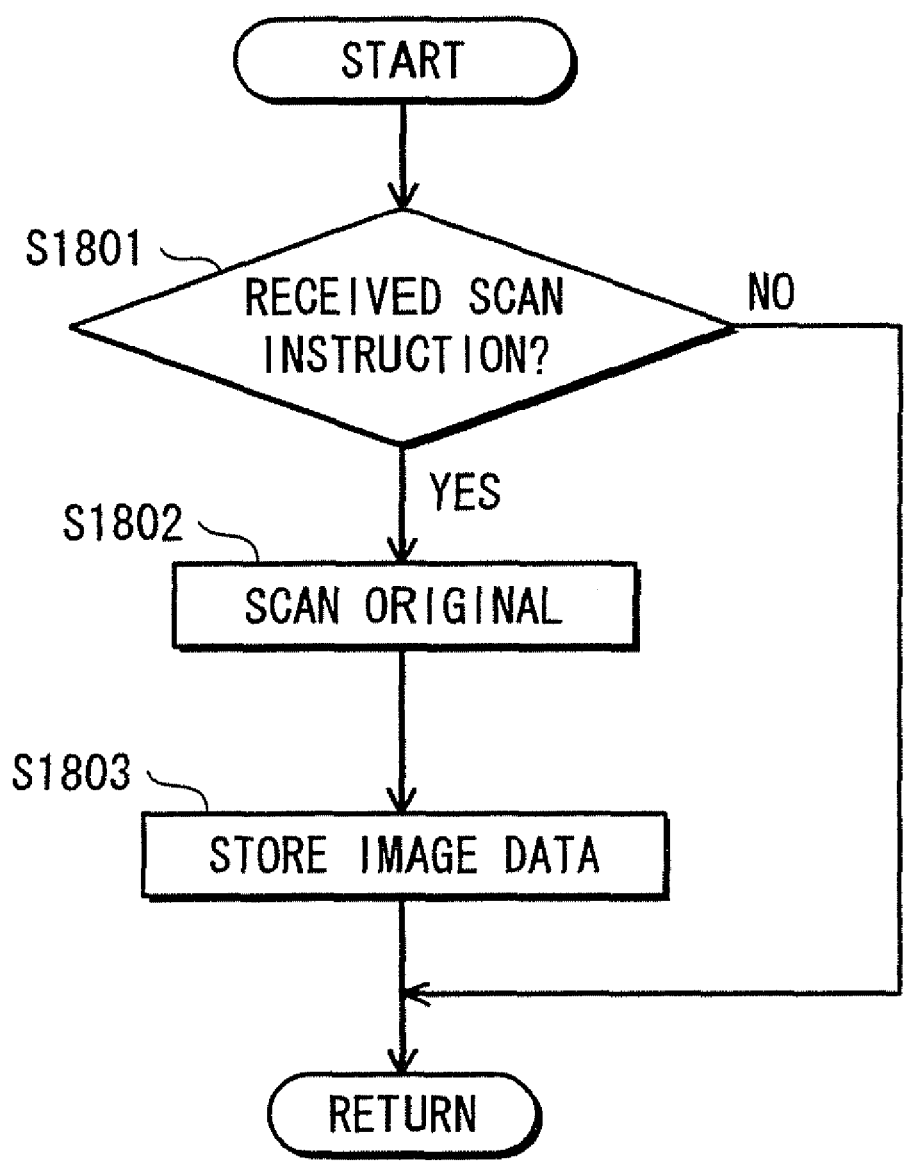
FIG. 18 is a flowchart showing image data scan processing pertaining to the embodiment of the present invention.

FIG. 18 is a flowchart showing the image data scan processing. As shown in FIG. 18, the MFP 101 receives an instruction to read image data from the user (S1801:YES), causes the scanner 1410 to scan an original (S1802), and stores the resulting image data (S1803). Thereafter, or if a scan instruction has not been received (S1801:NO), the MFP 101 returns to a higher-level routine.

(c) Image Data Transmission Processing

The following describes the image data transmission processing (S1604).

Figure 19:
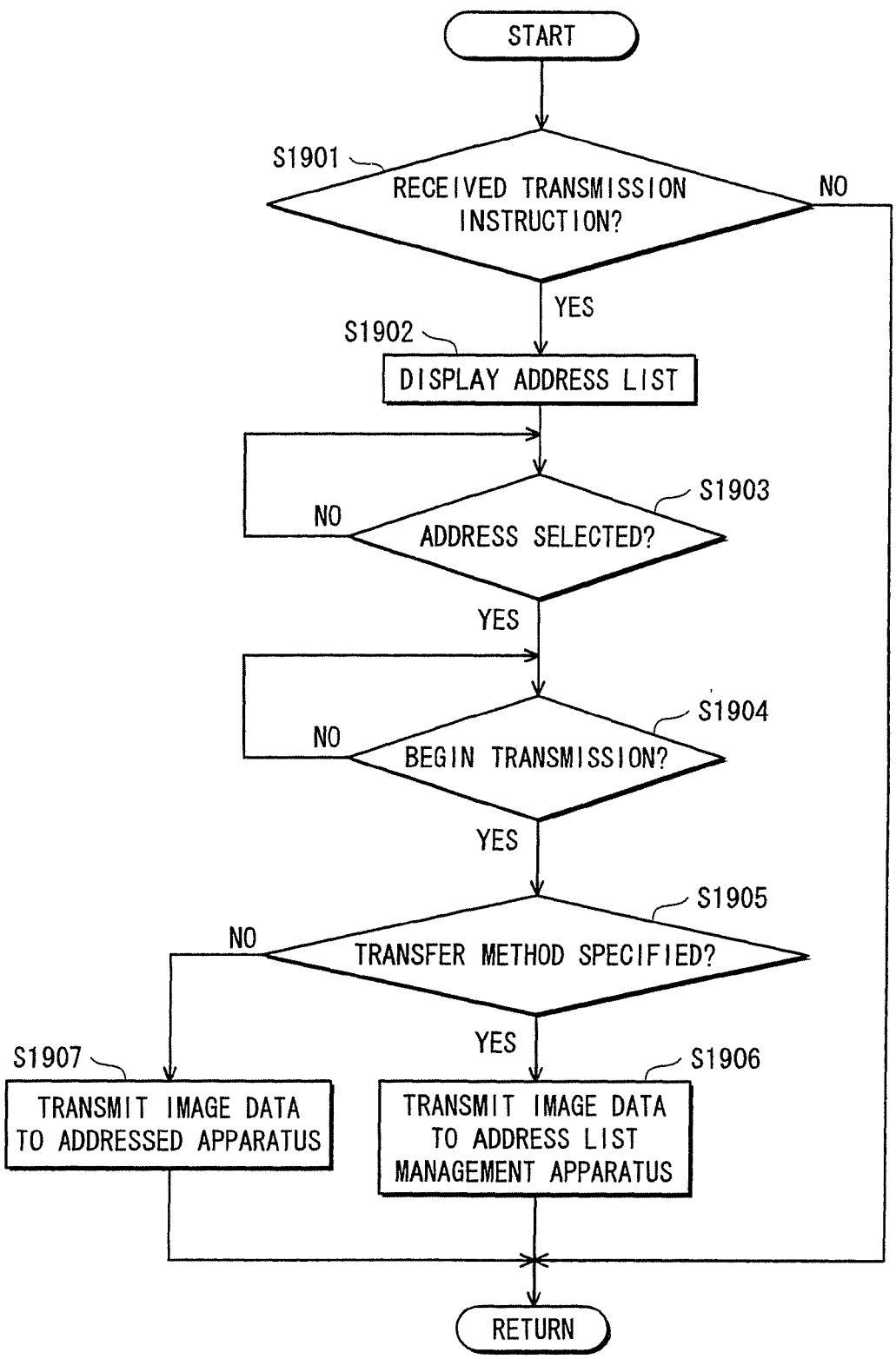
FIG. 19 is a flowchart showing image data transmission processing pertaining to the embodiment of the present invention.

FIG. 19 is a flowchart showing the image data transmission processing. As shown in FIG. 19, the MFP 101 receives an instruction to transmit image data (S1901:YES), and displays an address list on the operation panel 1409 (S1902). In this case, registration names, transmission methods and transmission destination addresses from the example shown in FIG. 12 are displayed on the operation panel 1409.

Upon receiving user input selecting one of the addresses displayed on the operation panel 1409 (S1903:YES), and then receiving a transmission start instruction via the same operation panel (S1904:YES), the MFP 101 refers to the address table and checks whether a transfer method is specified in the address information piece selected by the user.

If a transfer method is specified (S1905:YES), the MFP 101 transmits image data to the address list management apparatus 100 in accordance with the specified transfer method (S1906). If a transfer method is not specified (S1905: NO), the MFP 101 transmits the image data to the addressed apparatus in accordance with the transmission method specified in the address information piece (S1907).

The MFP 101 returns to a higher-level routine if a transmission instruction has not been received (S1901:NO), or after step S1906 or S1907 has been performed.

Accordingly, the MFP 101 can transmit image data to an addressed apparatus via the address list management apparatus 100 even without having login information for the addressed apparatus.

(d) Logout Processing

The following describes the logout processing (S1605).

Figure 20:
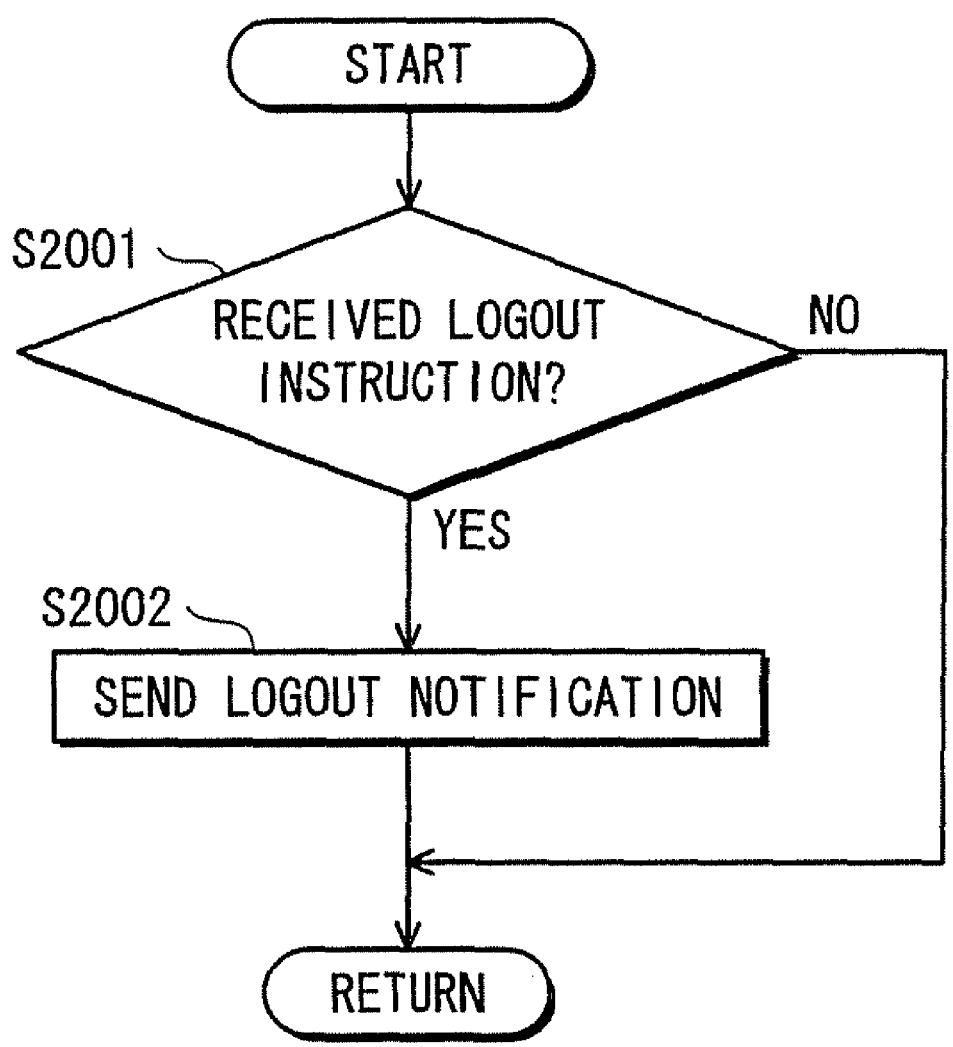
FIG. 20 is a flowchart showing logout processing pertaining to the embodiment of the present invention.

FIG. 20 is a flowchart showing the logout processing. As shown in FIG. 20, the MEP 101 receives a logout instruction from the user via the operation panel 1409 (S2001:YES), and sends a logout notification to the address list management apparatus 100 (S2002). The MFP 101 returns to a higher-level routine if the logout instruction has not been received (S2001: NO), or after step S2002 has been performed.

Modifications

Although described above based on the embodiment, the present invention is of course not limited to the embodiment. Modifications such as the following can also be implemented.

(1) Although in the embodiment, the MFP varies the image data transmission method according to whether a transfer method is specified in the address list, needless to say the present invention is not limited to this. The present invention may instead have a structure such as the following.

Specifically, rather than separately providing transfer method and transfer destination address fields when creating the sending list, the address list management apparatus may describe the transfer method and transfer destination address in the fields for transmitting the image data to the addressed apparatus, such as the transmission method and transmission destination address fields. FIG. 21 is a table showing an exemplary sending list pertaining to the present modification.

Accordingly, the MFP transmits the image data only in accordance with the address list transmission method, regardless of whether the MFP transmits the image data directly to the addressed apparatus or whether the MFP causes the address list management apparatus to transfer the image data to the addressed apparatus.

(2) Although only a case in which the MFP transmits image data is described in the embodiment, needless to say the present invention is not limited to this. The MFP may transmit data other than image data.

(3) Although a case in which the address list management apparatus transfers the image data to the addressed apparatus if the address information includes a login ID and password, needless to say the present invention is not limited to this. Even in the case of information other than a login ID and password, the address list management apparatus may transfer the image data to the addressed apparatus if the information carries the risk of leaking secret information.

(4) Although a case in which a sending list is created when an address list request is received from the MFP is described in the embodiment, needless to say the present invention is not limited to this. The sending list may be created and stored before an address list request is received.

For example, the sending list may be updated and stored each time the address list is updated.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An address list management apparatus for recording an address list that is specific to a user of an image formation apparatus and includes one or more address information pieces for transmission of data by the image formation apparatus, the address list management apparatus comprising:
   a sending list creator operable to create a sending list by, for each address information piece including secret information in the address list, deleting the secret information and changing each address information piece such that data to be transmitted from the image formation apparatus to a specified address in the sending list is instead transmitted to the address list management apparatus;
   an address list request receiver operable to receive an address list request, which is a request from the image formation apparatus for the address list specific to the user;
   a sending list transmitter operable to, upon reception of the address list request, transmit to the image formation apparatus the sending list that pertains to the user; and
   a data transfer part operable to, upon reception of the data and the specified address received from the image formation apparatus, read the address information pieces in the address list and transfer the received data to the specified address.

2. The address list management apparatus of claim 1, further comprising:
   a data storage (i) having one or more storage areas for storing data, each storage area storing data for a specific pair of the user of the image formation apparatus and an address, and (ii) operable to store the data received from the image formation apparatus in the storage area of the specific pair of the user of the image formation apparatus and the address that pertain to the received data.

3. The address list management apparatus of claim 2, wherein
   the data storage is further operable to delete the data from the storage area of the specific pair of the user of the image formation apparatus and the address after the data transfer part has transferred the data.

4. The address list management apparatus of claim 2, wherein
   each of the one or more storage areas is associated with a different one of the one or more address information pieces, and
   in order to transfer the data, the data transfer part first reads the address information piece associated with the storage area storing the data.

5. The address list management apparatus of claim 1, wherein
the secret information is a login ID and a password for logging in to a device of the specified address.

6. An address list management method used by an apparatus for recording an address list that is specific to a user of an image formation apparatus and includes one or more address information pieces for transmission of data by the image formation apparatus, the address list management method comprising the steps of:
creating a sending list by, for each address information piece including secret information in the address list, deleting the secret information and changing each address information piece such that data to be transmitted from the image formation apparatus to a specified address in the sending list is instead transmitted to the apparatus for recording the address list;
receiving an address list request, which is a request from the image formation apparatus for the address list specific to the user;
transmitting to the image formation apparatus, upon reception of the address list request, the sending list that pertains to the user; and
upon reception of the data and the specified address received from the image formation apparatus, reading the address information pieces in the address list and transmitting the received data to the specified address.

7. The address list management method of claim 6, wherein
the apparatus for recording the address list includes one or more storage areas for storing data, each storage area storing data for a specific pair of the user of the image formation apparatus and an address, and
the address list management method further comprises the step of:
storing the data received from the image formation apparatus in the storage area of the specific pair of the user of the image formation apparatus and the address that pertain to the received data.

8. The address list management method of claim 7, wherein
the data is deleted from the storage area of the specific pair of the user of the image formation apparatus and the address after the data has been transmitted.

9. The address list management method of claim 7, wherein
each of the one or more storage areas is associated with a different one of the one or more address information pieces, and
the address information piece associated with the storage area storing the data is read in order to transmit the data.

10. The address list management method of claim 6, wherein
the secret information is a login ID and a password for logging in to a device of the specified address.

11. A non-transitory computer readable storage medium storing therein a program executed by an apparatus for recording an address list that is specific to a user of an image formation apparatus and includes one or more address information pieces for transmission of data by the image formation apparatus, the program comprising the steps of:
creating a sending list by, for each address information piece including secret information in the address list, deleting the secret information and changing each address information piece such that data to be transmitted from the image formation apparatus to a specified address in the sending list is instead transmitted to the apparatus for recording the address list;
receiving an address list request, which is a request from the image formation apparatus for the address list specific to the user;
transmitting to the image formation apparatus, upon reception of the address list request, the sending list that pertains to the user; and
upon reception of the data and the specified address received from the image formation apparatus, reading the address information pieces in the address list and transmitting the received data to the specified address.

* * * * *